Nov. 5, 1929.                K. W. HUFFINE                1,734,209
                           INSULATING STRUCTURE
                            Filed June 11, 1927
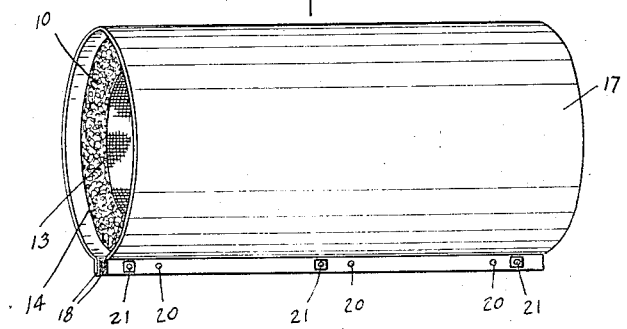
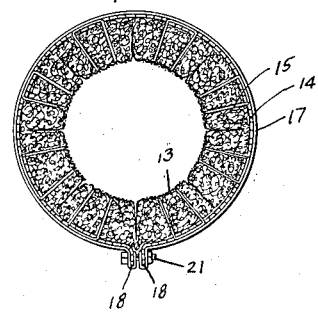
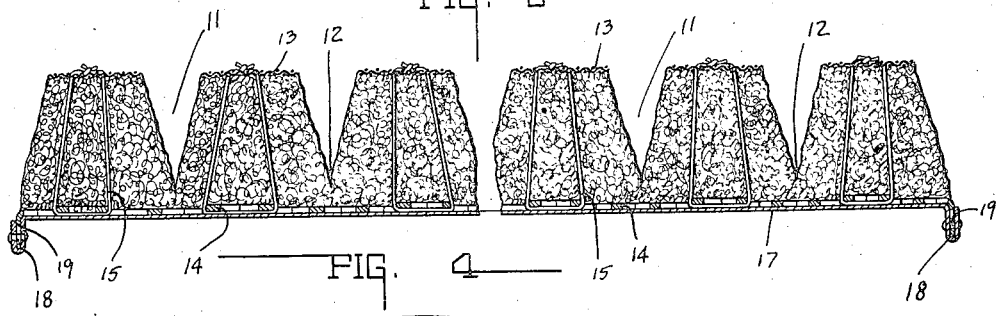
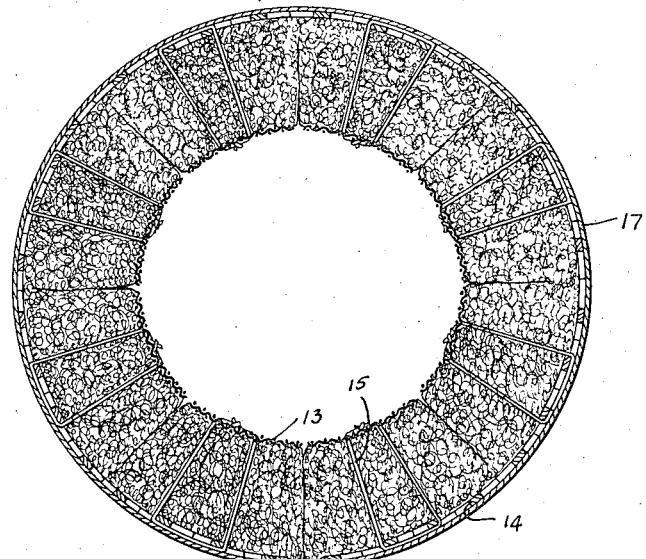
INVENTOR.
KENNETH W. HUFFINE.
BY
    ATTORNEYS.

Patented Nov. 5, 1929

1,734,209

UNITED STATES PATENT OFFICE

KENNETH W. HUFFINE, OF ALEXANDRIA, INDIANA, ASSIGNOR, BY MESNE ASSIGNMENTS, TO BANNER ROCK CORPORATION, OF ALEXANDRIA, INDIANA, A CORPORATION OF DELAWARE

INSULATING STRUCTURE

Application filed June 11, 1927. Serial No. 198,234.

This invention relates to improvements in the construction of a pre-formed insulating jacket which is water proof, fire proof, durable and efficient and is particularly adapted for use upon cylindrical structures such as pipes and especially refinery and other chemical plant piping.

The object of this invention is to pre-form insulating jacketing suitable for ready mounting about the periphery of a pipe and which when positioned thereon forms a substantially permanent, rust proof, water proof, durable and efficient insulation.

One feature of the invention consists in the employment of metal lath in the insulation and the employment of sheet metal cover, the two being secured together by a special flange and rivet arrangement.

The full nature of the invention will be understood from the accompanying drawings and the following description and claims:

In the drawings Fig. 1 is a perspective view of a portion of pipe covering in pipe covering relation. Fig. 2 is a transverse sectional view. Fig. 3 is a transverse sectional view of a portion of an insulating strip including a plurality of segments arranged in the same plane. Fig. 4 is an enlarged sectional view of the combination locking arrangement.

This invention is an improvement upon that shown in the patent to Hall, 1,611,907, issued December 28, 1926, and also that shown in the copending application Serial No. 153,986, entitled "Insulating structure" filed February 10, 1926 by E. R. Powell.

The jacket of the present invention is formed in strips of suitable width for smaller pipes, opposite ends of the strips being joined together as hereinafter pointed out when the width is such that a single strip will substantially encircle the object. When the diameter of the object is sufficiently large a plurality of strips positioned adjacent to each other will be required and these will have their adjacent ends united together as in the manner hereinafter to be described in detail.

Each strip, see particularly Fig. 3, includes a plurality of main body segments 10 normally separable by grooved portion such as the grooves 11 and said segments are preferably united together adjacent the root of the groove as at 12. The body portion is of suitable insulating and heat resisting material such as rock wool, asbestos or other suitable similar material. Herein the inner face of each of the segments is covered by a suitable reinforcement such as a layer of wire mesh or screen 13. The entire strip is backed upon the opposite side by a layer of expanded metal latch 14.

In the present disclosure there is also provided stapling 15 in the form of a U-shaped wire which reinforces the body segment so that it will have sufficient strength to retain the weight of a man walking thereon. The stapling 15 has a laced connection with the wire screen and the metal lath and said stapling may be copper or copper clad or otherwise coated for resistance to rust. Covering the expanded metal lath is a sheet metal casing 17.

The metal sheet or covering 17 is of slightly longer length than the body portion 10 and includes the V-shaped groove 18 at each end into which extends the extension 19 of the expanded metal lath. Suitable rivets 20, see Fig. 1, pass through the two walls of the groove to clampingly secure the expanded metal lath therebetween. If, as shown in Fig. 1, a single strip will encircle the pipe or object, clamping bolts 21 pass through both adjacent flaps and unite the opposite ends of the strips together in pipe encircling relation.

When relatively long stove bolts 21 are employed to secure the adjacent flanges together, whether they be of the same sheet or of different sheets, the bolts serve to compress or make the insulation conform to the surface to be protected. As shown in the drawings, the surface of the segments is substantially flat but is deformed to conform to the surface of the object to be covered when sufficient clamping force is applied by the bolts. Also the bolts insure complete insulation or continuous contact between the object to be insulated and the insulation even though it may happen that the sheet is slightly distorted or deformed in shipment.

The invention claimed is:

1. In a pipe covering the combination of a sectional covering having a longitudinal joint, the covering including sheet means terminating in longitudinal grooves coincident with the joint parting, and an insulation supporting metal lath adjacent thereto and secured to the sheet means in the groove thereof.

2. In a pipe covering the combination of a sectional covering having a longitudinal joint, the covering including sheet means terminating in longitudinal grooves coincident with the joint parting, a metal lath adjacent thereto and secured to the sheet means in the groove thereof, and transverse members extending through the adjacent groove-forming portions of the sheet metal for securing the adjacent portions of the joint together.

3. An insulating structure including a multiple segment fire-proof and heat insulating body portion, a metal lath backing the same, a metal screen covering the body segments opposite the lath supported portion thereof and secured to the lath, and an imperforate metal sheet covering the same and secured to the lath.

In witness whereof, I have hereunto affixed my signature.

KENNETH W. HUFFINE.